UNITED STATES PATENT OFFICE.

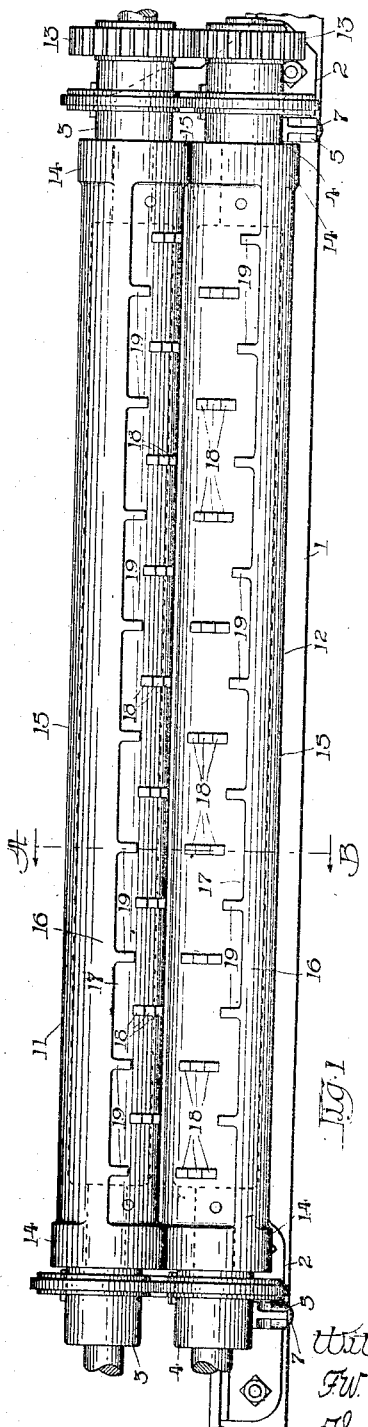

JOHN A. STONE, OF CHICAGO, ILLINOIS, ASSIGNOR TO INTERNATIONAL HARVESTER COMPANY, A CORPORATION OF NEW JERSEY.

CORN-HUSKING ROLLERS.

No. 919,392.  Specification of Letters Patent.  Patented April 27, 1909.

Application filed December 26, 1908. Serial No. 469,379.

*To all whom it may concern:*

Be it known that I, JOHN A. STONE, a citizen of the United States, residing at Chicago, in the county of Cook and State of Illinois, have invented certain new and useful Improvements in Corn-Husking Rollers, of which the following is a specification.

My invention relates to husking rollers designed to be arranged in coacting pairs and having opposing moving surfaces adapted to grasp the husks between them and remove them from the ears; the object of my invention being to provide a roller having an improved form of peripheral surface adapted to coact with a corresponding one in an aggressive and efficient manner in the operation of removing the husks from the ears of corn. This object is attained by means of the mechanism illustrated in the accompanying drawing, in which—

Figure 1 is a top view of a pair of husking rollers embodying my invention; Fig. 2 is a cross section of Fig. 1 along the line A—B; and Fig. 3 is an end view of Fig. 1, illustrating the manner of mounting the rollers, one of them being journaled in a laterally yielding spring-pressed sleeve that allows it to yield away from its coacting roller when subjected to undue strain.

The same reference numerals designate similar parts throughout the several views.

1 designates a frame member having bracket members 2 secured to opposite ends thereof, the brackets being provided with bearing boxes 3 and 4 that are loosely received in openings therein, the box 4 being permitted to move laterally in the opening provided for it; and 5 designates a lever having one end pivotally connected with the bracket at 6 and its opposite end contacting with the box 4. A bolt 7 passes through the middle portion of the lever and through an ear 8 upon the bracket, and 9 designates a spring coiled about the bolt and operative between an adjusting nut 10 and said ear to yieldingly press the lever against the box.

Husking rollers 11 and 12 are journaled in the boxes 3 and 4, respectively, the roller 11 being placed in a plane above that of its coacting roller 12, as is common in this class of machines, and motion is communicated to the rollers by means of gear members 13. The rollers are provided at opposite ends thereof with short concentric portions 14, for the purpose of producing a steady rolling movement thereof when the concentric portions are in contact with each other. The body portions of the rollers are designed to engage with the husks in a manner to strip them from the ears of corn, and for this purpose are given rapid rotative movement in opposite directions to their axes, and in order that they may perform that function in an efficient manner, they are provided with surfaces having a novel form which in coactive operation will aggressively grasp the husks and remove them from the ears, including oppositely disposed surfaces 15, having an involute form relative to the axis of rotation and extending lengthwise of the roller substantially parallel with its body, and intermediate concentric surfaces 16 that are also oppositely disposed and are connected with the involute portions in the direction of rotation of the rollers by means of short tangentially arranged surfaces 17 connecting with the involute portions at the line having the shortest radius.

18 designates radially projecting teeth that are raised above the surface of the involute portions and are arranged in a series of groups of three in circumferential lines about the axis of the roller, and in a line with its body, with intervening spaces between the groups; and 19 designates teeth raised above the tangentially arranged surfaces, the teeth being opposite the spaces between the groups upon the involute surfaces and in a line substantially parallel with the body of the roller. The teeth are preferably given a ratchet-like form, with the radial sides in the direction of rotation of the rollers about their axes, and are arranged upon separate rollers so that the groups of teeth upon one roller will be presented against the spaces between the coacting rollers and in like manner the teeth upon the tangentially arranged portion of the roller will be presented against the spaces between the corresponding rollers.

What I claim as my invention, and desire to secure by Letters Patent, is:—

1. A corn husking roller having oppositely disposed involute peripheral surfaces, and a series of groups of radially projecting teeth arranged in circumferential lines thereon.

2. A corn husking roller having oppositely disposed involute peripheral surfaces, and intermediate concentric surfaces, said involute surfaces having a series of groups of radially projecting teeth arranged in circumferential lines thereon.

3. A corn husking roller having oppositely disposed involute peripheral surfaces, and intermediate concentric surfaces, said involute surfaces having a series of groups of radially projecting teeth arranged in circumferential lines thereon, and a series of teeth upon said concentric surfaces.

4. A corn husking roller having oppositely disposed involute peripheral surfaces, intermediate concentric surfaces, said involute surfaces having a series of groups of radially projecting teeth arranged in circumferential lines thereon, and a series of teeth upon said concentric surfaces arranged opposite the spaces between said groups of teeth.

5. A corn husking roller having oppositely disposed involute peripheral surfaces, and a series of groups of radially projecting teeth thereon, each group of teeth being arranged in circumferential lines relative to the axis of the roller, and a series of groups in a line substantially parallel with the body of the roller.

6. A corn husking roller having oppositely disposed involute peripheral surfaces, intermediate concentric surfaces, said involute surfaces having a series of groups of radially projecting teeth thereon, said groups of teeth being arranged in circumferential lines relative to the axis of the roller, and a series of groups in a line substantially parallel with the body of the roller, and a series of teeth upon said concentric surfaces arranged opposite the spaces between said groups of teeth and in a line substantially parallel with the body of the roller.

7. A pair of coacting corn husking rollers having opposing involute peripheral surfaces provided with teeth, and intermediate opposing concentric surfaces.

8. A pair of coacting corn husking rollers having opposing involute peripheral surfaces provided with teeth, intermediate opposing concentric surfaces, and opposing surfaces arranged tangentially relative to the axis of the rollers.

JOHN A. STONE.

Witnesses:
  EDW. J. TEUFEL,
  A. B. DACK.